May 11, 1948.    E. H. SCHENK    2,441,212
LEVER FOR AIRCRAFT CONTROLS
Filed April 27, 1945    2 Sheets-Sheet 2

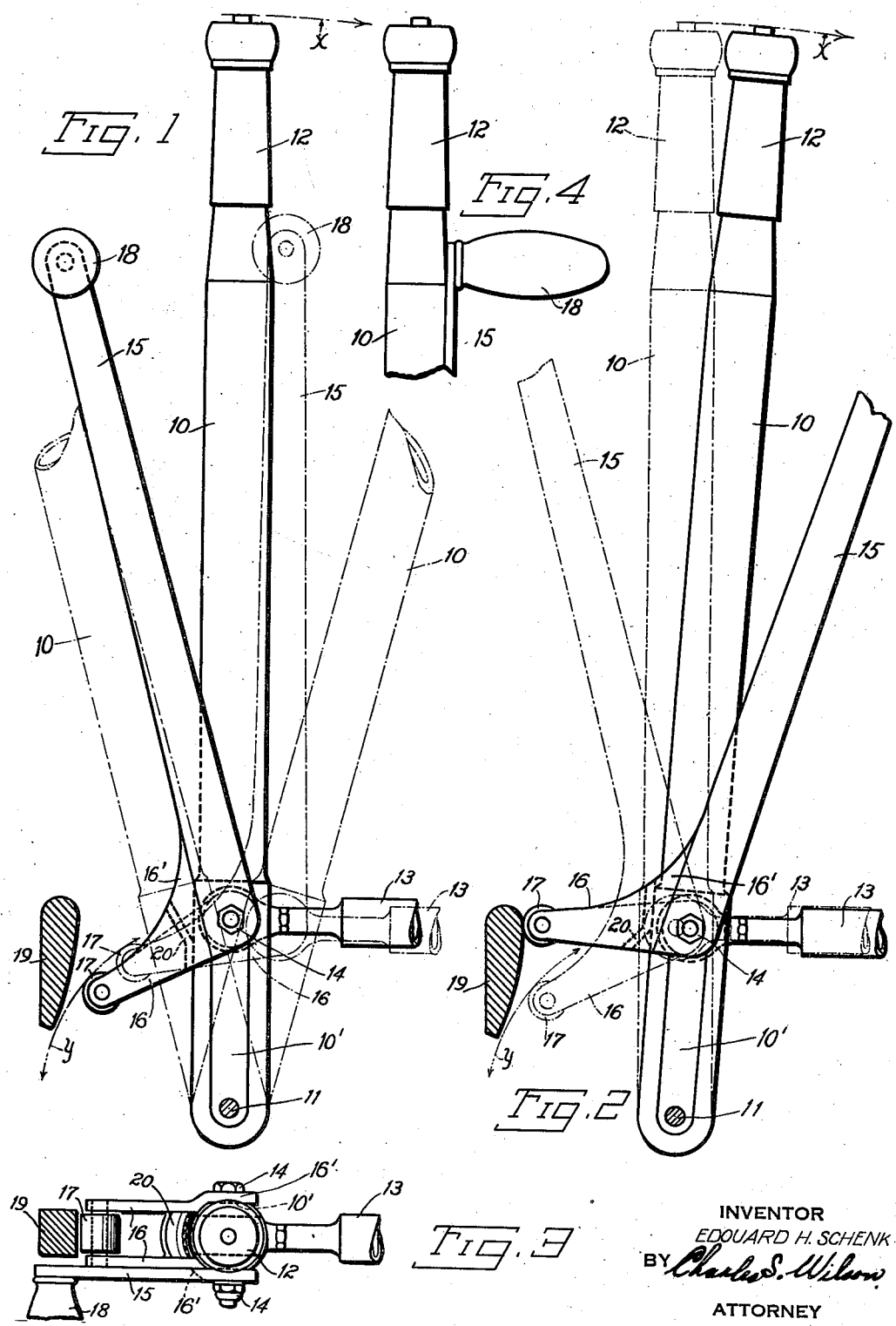

INVENTOR.
EDOUARD H. SCHENK
BY Charles S. Wilson
ATTORNEY.

Patented May 11, 1948

2,441,212

UNITED STATES PATENT OFFICE 2,441,212

LEVER FOR AIRCRAFT CONTROLS

Edouard H. Schenk, New York, N. Y., assignor to Republic Aviation Corporation, Farmingdale, N. Y., a corporation of Delaware Application April 27, 1945, Serial No. 590,693

15 Claims. (Cl. 74—479)

This invention relates to the controls for movable airfoils and contemplates a structure that will function normally in the usual and standard manner and at the same time include normally inoperative means for supplying a supplementary mechanical advantage to the control when required.

The present control proposes a normally ineffective and inoperative auxiliary control that in no way interferes with the usual and customary operation and functioning of the principal control but which may be brought into operation to supplement and augment the forces applied by the said principal control for the regulation and movement of movable airfoils.

Among other objects the instant invention has in view an auxiliary control operable in conjunction with the principal or main control for the movable airfoils of an aircraft to not only initiate the operation of the principal control when "frozen" or immovable by normal or conventional means but also to continue to boost or augment the forces normally applied to the main control and thereby assist in the operation thereof after the start or initiation of its movement.

With the above and other objects in view, as will be apparent, this invention consists in the construction, combination and arrangement of parts, all as hereinafter more fully described, claimed and illustrated in the accompanying drawings, wherein:

Fig. 1 is a more or less schematic elevation of the present invention showing the principal control lever in its neutral or substantially vertical position and, in phantom lines, the normal operative throw of said control lever, the auxiliary control lever being shown in full lines in its inactive or inoperative position;

Fig. 2 is a similar view illustrating the functioning of the mechanical booster or auxiliary lever to supplement and augment the forces normally applied to the principal control lever for moving it from its neutral position under abnormal or emergency conditions, the inactive or inoperative position of the auxiliary lever being shown in phantom lines and its active or operative position in full lines;

Fig. 3 is a plan view of the control lever as disclosed in full lines in Fig. 1;

Fig. 4 is an elevation showing the relative positions of the handles of the control and auxiliary levers;

Figure 5:
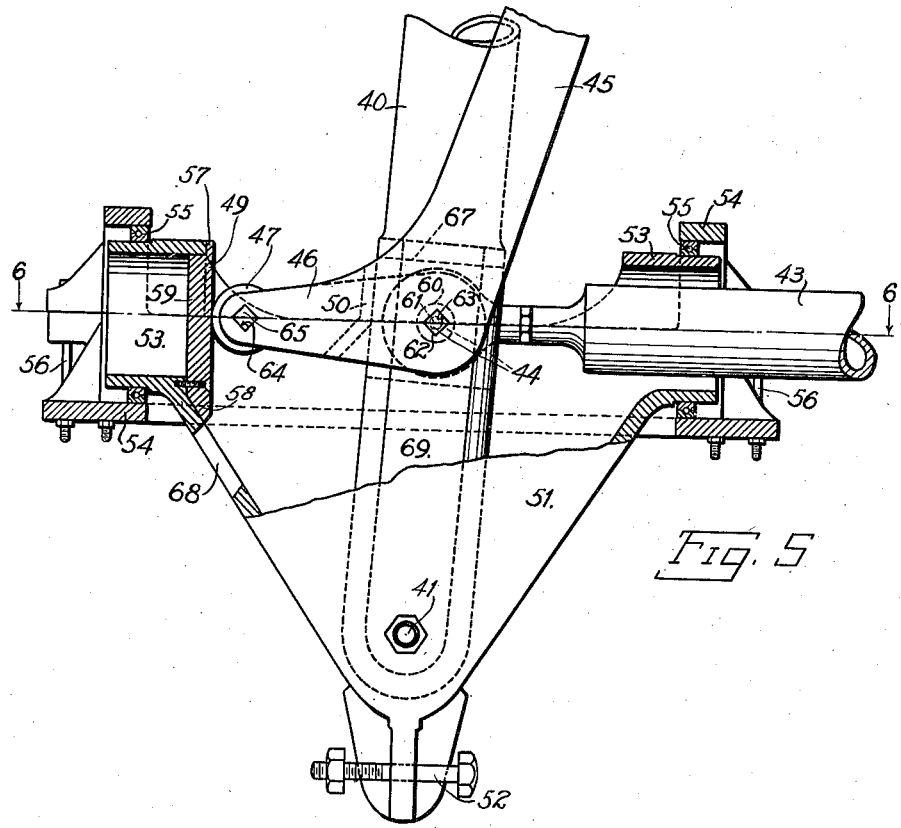
Fig. 5 is an elevation, partly in vertical section along line 5—5 of Fig. 6, illustrating the structural details of the present invention as applied to a conventional pilot operated aircraft control lever of the "cradle" type for the operation of both ailerons and elevators.

As is well known, control surfaces or airfoils frequently become "frozen," or immovable by conventional means, due to the lack of aerodynamic balance resulting from high speed or compressibility effects acting on the control surfaces during flight. The movement or adjustment of an airfoil or control surface from either neutral or adjusted positions is extremely difficult, if not impossible, under these conditions by ordinary or customary controls heretofore available to the pilot. Limitations of pilot strength and of the mechanical advantage available to the pilot is largely responsible for inability to move or initiate movement of a "frozen" airfoil or control surface. At high speeds the angular adjustment required for the movable control surfaces or airfoils is relatively small and once the movement thereof has been initiated the conventional means at the disposal of the pilot is usually sufficient to continue the operation until the desired adjustment is attained.

Therefore, the present invention proposes an auxiliary means, normally ineffective, but operable in conjunction with the main or conventional controls for supplying greater and additional or supplementary mechanical advantage to the main or principal control whereby its movement may be initiated. Furthermore the present invention proposes an auxiliary mechanism or device operable in conjunction with the usual, standard main control which may continue to boost the mechanical advantage of the main or principal control if such continued boosting is required or necessary.

While the present invention is shown in conjunction with a conventional stick or principal control lever for the adjustment of the elevators and ailerons of an aircraft it can be adapted to any type of controls such as those for the rudders, flaps, tabs and other movable airfoils or control surfaces without departing from the principles hereof.

In the more or less schematic showing of Figs. 1 to 4, 10 indicates a manually operated aircraft control lever having its lower end fulcrumed as at 11 on a fixed part of the aircraft structure (not shown). The free upper end of this lever is provided with a coextensive grip or handle 12 and manual force applied at the handle 12 to the lever 10 is transmitted by said lever to any member or mechanism (not shown) to be controlled thereby through a connecting link or rod 13 pivoted by the transverse bolt 14 to the lever 10, intermediate of its pivot 11 and its handle or grip 12, but substantially nearer to the former. The rod or link 13 may be the conventional push-pull rod and is directly or indirectly connected at one end to the movable airfoil to be controlled and, as above indicated, is connected at its other end to the control lever 10 in any standard or customary manner. Between the pivotal mounting 11 and the bolt 14 the lever 10 may be flattened on its opposed sides, as at 10'.

On the bolt 14 is also pivoted an auxiliary lever or bellcrank having a power arm 15 juxtaposed to the power arm of the control lever 10 to terminate below the handle 12. At its lower end and projecting laterally therefrom at the bolt 14 the auxiliary lever is provided with a forked work arm 16 having offset inner ends 16' straddling the lever 10 and carrying between its free outer ends a roller or cam-follower 17. The upper free end of the power arm 15 is provided with a grip or handle 18 projecting laterally or horizontally therefrom at right angles on the side thereof opposed to the control lever 10 and hence this handle 18 is located below the handle 12 regardless of the position of the auxiliary lever 15—16 with respect to the control lever 10. The relative arrangement of said grips or handles 12—18 is such that the pilot may conveniently grasp only the control lever 10 or may simultaneously grasp the control lever 10 with one hand and the auxiliary lever 15—16 with his other hand whereby said levers may be operated independently or in unison.

A cam or inclined plane 19 is situated in a fixed position relative to the fulcrum 11 and out of the normal path of movement of the control lever 10 or its associated parts but to cooperate with the roller 17 of the auxiliary lever 15—16, as shown in Fig. 2, when the auxiliary lever 15—16 is moved or swung from its inactive or inoperative position, shown in solid lines in Fig. 1 and in phantom lines in Fig. 2, to its full active or operative position, shown in solid lines in Fig. 2, to initiate or assist in the movement of the lever 10 out of its vertical neutral position.

The two parallel branches of the work arm 16 extending beyond the offsets 16' are braced or interconnected adjacent the lever 10 by means of a V-shaped rib 20, which also acts as a double stop to limit the throw or angular travel of the auxiliary lever 15—16 relative to the control lever 10 in either direction. Preferably (as shown Fig. 2), this throw is so limited that the auxiliary lever 15—16 may move equidistantly upon either side of the mean or central line of the control lever 10 especially in its neutral position as shown in Fig. 1. However it is not necessary to limit the throw of the auxiliary lever 15—16 to any angular degree relative to the control lever 10 as that obviously is merely a matter of design.

In Figs. 1 to 3, inc., the pivot 11 and the cam 19 are shown in section to indicate that both are relatively immovable and may be mounted on a common supporting structure preferably a fixed part of the aircraft structure.

The operation of this form of the mechanical booster, constructed and arranged in accordance with the present invention, and shown in Fig. 1 to 4, inc., is as follows:

Under normal conditions, the auxiliary lever 15—16 is positioned as shown in full lines in Fig. 1 and the pilot manipulates only the control lever 10. The auxiliary lever 15—16 then moves in unison with but not relative to the control lever 10 and therefore does establish contact with the cam 19 by means of the roller 17. Hence the auxiliary lever 15—16 does not interfere with the normal operation of the control lever 10 and for all practical purposes is non-existent. The slight friction existing between the flattened sides 10' of the control lever 10 and the offset inner ends 16' of the fork or work arm 16 of the auxiliary lever 15—16 prevents any accidental relative movement between these two levers as long as the handle 18 is not intentionally moved from its idle or inactive position. The extent of this frictional engagement or contact may be adjusted and regulated by the usual nut coacting with the bolt 14. Under these conditions the roller 17 travels, during the normal operation of the control lever 10, within the confines of a circle Y having the pivot 11 as its center and cannot, therefore, contact the cam 19 located outside or beyond this circle Y.

When, however, the control lever 10 is "frozen" in, or is difficult to move from, its neutral position, i. e. when the pilot is unable to initiate movement of said lever 10, the shifting of the auxiliary lever 15—16 relative to the control lever 10 augments the normal forces applied to the control lever 10. By using one hand to manipulate the control lever 10 and his other hand to move the auxiliary lever 15—16 relatively to the lever 10, the pilot may swing the lever 15—16 from its inactive position shown in full lines in Fig. 1 to its active position shown in full lines in Fig. 2. Any movement of the lever 15—16 in the direction of the arrow X out of its idle or inactive position projects the roller 17 beyond the circle Y into contact with the cam or inclined plane 19 whereupon the continued swinging movement of the auxiliary lever 15—16 relative to the control lever 10 develops a thrust on the latter opposed to the resistance of the rod or link 13. This thrust is in addition to and therefore augments any force applied by the pilot to the lever 10 at the handle or grip 12. The additional force resulting from this manipulation of the lever 15—16 combined with force applied directly to the lever 10 at its grip 12 starts or initiates movement of the control lever 10 and this movement of the lever may be continued, in either direction, in the normal or conventional manner independently of the auxiliary lever 15—16. Once the movement of the control lever 10 is started in the direction of the arrow X, the lever usually can be freely swung in either direction and since the auxiliary lever 15—16 then performs no further function nor is it then necessary to this continued movement of the control lever 10, it may be moved counter clockwise to its idle or inactive position as shown in full lines in Fig. 1 and in phantom lines in Fig. 2. It is manifest that in that form of the invention illustrated in Figs. 1 and 2, the auxiliary lever 15—16 in assisting the initiation of movement of the lever 10 always swings relative to the lever 10 from the phantom line position to the full line position in Fig. 2, and, as a consequence, always initially moves the lever 10 in the direction indicated by arrow X. Once movement of the lever 10 is started it may be swung in either direction as required by operational conditions of the aircraft.

However, if operating conditions of the aircraft require that the forces normally applied to the control lever 10 at the grip or handle 12 be increased or augmented after its movement has once begun the pilot may continue the swinging movement of the auxiliary lever 15—16 relative to the lever 10. This subsequent movement of the lever 15—16 is only limited by the V-rib or stop 20 and by the length of the cam or inclined plane 19, the design and effectiveness of each of which may be altered or varied without departing from the spirit and scope hereof. Though the form of the mechanical booster of the present invention shown in Figs. 1 and 2 is adapted to "unfreeze" or help start the active motion of a control lever 10 over a relatively small initial part of its angular travel, it will be easily understood by those skilled in the art that this initial angle of adjustment can be increased by increasing the throw of the auxiliary lever 15—16 and correspondingly lengthening the inclined plane or fixed cam 19. The whole auxiliary device of the instant invention can readily be adapted to boost manually, not only the initial but also the final motion of the control lever 10 and by merely duplicating the elements 16—17—19 on the opposite side of the lever 10, this structure can be adapted for boosting a double action control lever in either direction.

Figure 6:
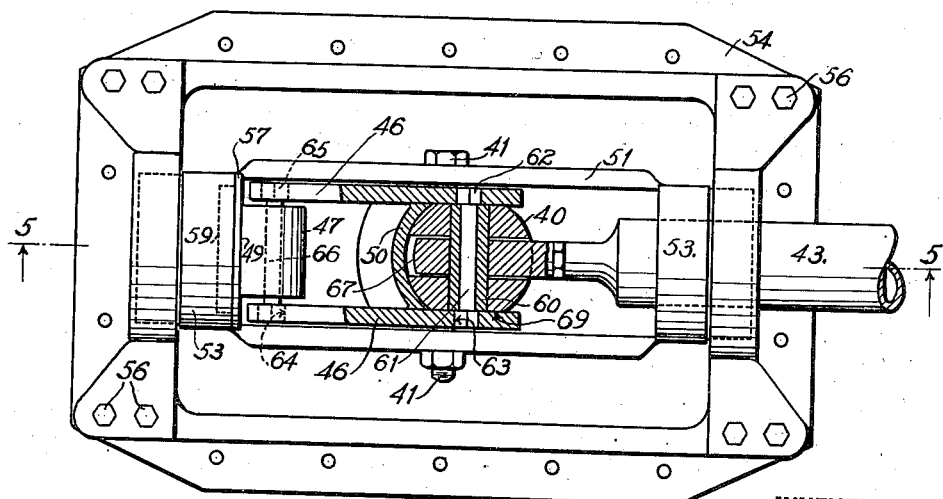
Fig. 6 is a plan view of the structure disclosed in Fig. 5 with parts in horizontal section along line 6—6 thereof.

In Figs. 5 and 6, a specific and detailed adaptation of that form of the invention illustrated schematically in Figs. 1 and 2 is disclosed as applied to an aircraft control lever of the "cradle" type. Here the stick or control lever 40 is fulcrumed or pivoted at 41 across the bottom or vertex of a hollow triangular cradle 51, for independent angular motion therein in the longitudinal plane of the aircraft to control the elevators thereof through a push-pull rod 43. This cradle 51 is also pivoted about the axis of said rod 43 whereby the stick or lever 40 and the cradle may swing in unison in a plane transverse to the longitudinal plane of the aircraft to control the ailerons of the aircraft through push-pull rods (not shown) secured to the cradle by a bolt 52. In this adaptation a common pivot 44 is provided across the control lever 40 to attach the ends of both the elevator rod 43 and the auxiliary lever or bellcrank 45—46 to the lever 40. This auxiliary lever 45—46 comprises an operating arm 45 adjoining the control lever 40 and a forked work arm 46 disposed angularly to the arm 45 and straddling said control lever 40 after the manner of the work arm 16 in Figs. 1 and 2. The free end of the work arm 46 carries a roller 47 for cooperation with a disk 49 which is the full equivalent in function and operation of the cam 19 or inclined plane in Figs. 1 and 2. A V-shaped rib 50 braces the branches of the forked arm 46 and acts as a double stop to limit the angular throw of the auxiliary lever 45—46 relative to the control stick 40.

A pair of aligned hollow trunnions 53 are formed or situated on the upper part of the cradle 51 whereby the latter is mounted for swinging movement about the axis of the rod 43 in the fixed, split journals 54. Suitable thrust ball bearings 55 may be interposed between the journals 54 and the trunnions 53 according to standard practice. The halves of each bearing 54 are united by means of bolts 56 and the whole cradle and bearing assembly is fastened in an opening of the cockpit floor of the aircraft in the conventional manner.

The disk 49 which coacts with the roller 47 upon the operation of the auxiliary lever 45—46 has a solid cylindrical body 59 which forms a transverse partition at the inner end of one of the trunnions 53 and is fixedly secured to said trunnion in any suitable manner to withstand any loads to which it may be subjected during the operation of the auxiliary lever 45—46. The upper half of the disk is provided with a mounting flange 57 fitting over the edge of the coacting trunnion 53 and its lower half is provided with a slanting projection or lip 58 resting against the inner surface of the corresponding inclined side of the cradle 51. Thus any load applied to the disk 49 by the roller 47 during the operation of the auxiliary lever 45—46 (as shown Fig. 5) is uniformly distributed to the periphery of said disk and is directly transmitted through the trunnion 53 and the thrust bearings 55 to the fixed structure of the aircraft.

The end of the rod 43, which is the equivalent of the rod or link 13 in Figs. 1 and 2 in function and operation, is pivotally mounted on a cylindrical bushing 60 and that in turn is mounted with a close fit on a cross pin 61 forming the common pivot 44 of said rod and for the auxiliary lever 45—46. The two opposite ends 62 of said pin 61 are square in cross-section and project beyond the flattened portions or faces 69 of the control lever 40 to be received in corresponding square holes 63 provided in the forked work arm 46. The roller 47 is pivotally mounted on a fixed pin or pivot 66, which also has squared end portions 65 projecting into corresponding square holes 64 provided at the free ends of the branches of the work arm 46. The rigid frame thus formed by the two branches of the work arm or fork 46 and the two parallel pins 61 and 65 is further reinforced by the V-shaped rib 50 functioning as does the similar rib 20 in Figs. 1 and 2.

A conventional mortise 67 is provided in the control lever 40 to receive the end of the rod 43, while a hole or opening 68 is provided in the inclined opposed wall of the hollow cradle 51 to give passage or clearance for the roller 47 when the control lever 40 swings fore and aft during its normal, unassisted operation.

As in that form of the invention shown in Figs. 1 and 2, the arrangement of the centers of the disk 49 and of the pivot 44 in the pivotal axis of the cradle 51 is such that the auxiliary lever 45—46 and its roller 47 do not interfere with the normal fore and aft operation of the lever 40 nor is the transverse normal swinging motion of the cradle 51 by means of the stick 40 for the adjustment of the ailerons modified or interfered with by the auxiliary lever and its associated parts. When, however, the auxiliary lever 45—46 is swung relatively to the lever 40 in the manner described in connection with Figs. 1 to 4 the roller 47 contacts the disk 49 and develops a thrust on the lever 40 opposed to the resistance of the rod 43 thereby initiating and/or assisting in the movement of said lever. Manifestly Figs. 5 and 6 illustrate a detailed development of the invention graphically disclosed in Figs. 1 to 4 and beyond various minor variations in details and application the operation and functioning of the two are identical.

The structure shown and described herein may readily be adapted to any aircraft not otherwise provided with emergency power means for "unfreezing" the control lever or may be added to said power means as a precautionary auxiliary safety device for use in case of failure of said power boosters.

Many modifications and variations of the present invention, particularly in the details of construction and in the application thereof, are

What is claimed is:

1. The combination with a pivoted control lever having a portion for the manual operation thereof, of an abutment situated adjacent said lever, and an auxiliary lever, also having a portion for the manual operation thereof, and pivoted to swing relative to said control lever into and out of contact with said abutment to initiate movement of the control lever about its pivot.

2. The combination with a supporting structure, of a control lever fulcrumed to said structure, and a mechanical booster comprising an abutment fixedly mounted on said structure, and an auxiliary lever pivotally mounted on said control lever and swingable about its pivot relatively to said control lever to contact said abutment and thereby augment the forces normally applied to and moving said control lever.

3. The combination with an aircraft structure, of a control lever pivoted thereto, and a mechanical booster comprising a fixed abutment secured to the aircraft structure to lie without the normal path of movement of said control lever and its associated parts, and an auxiliary lever mounted on the control lever for pivotal movement in a plane parallel to the plane of movement of said control lever and movable relatively to said control lever to contact said abutment and thereby supplement a force normally applied to said control lever for its operation.

4. The combination with an aircraft, of a pivoted control member, and a mechanical booster comprising a stationary abutment mounted on said aircraft adjacent to and without the path of movement of said control member, and an auxiliary lever pivotally mounted on said control member to swing relatively thereto and thereby project a part of said auxiliary lever beyond the path of movement of said control member for riding contact with said abutment.

5. The combination with an aircraft structure, of a control lever pivotally mounted on said structure, a stationary abutment fixed to said aircraft structure adjacent to and without the path of movement of the control lever, an auxiliary lever pivotally mounted on said control lever in alignment with said abutment to normally rest adjacent to said control lever, and a lateral arm fixed to said auxiliary lever to be projected beyond the path of movement of the control lever by the movement of the auxiliary lever relatively to said control lever and thereby contact and progressively bear against said abutment.

6. The combination with an aircraft having a movable control surface, a pivoted control lever and an operating connection between said lever and said control surface, of a stationary abutment adjacent said control lever in apposition to said connection, an auxiliary lever mounted on said control lever for movement either relatively to or in unison with said control lever, and a normally inactive arm fixedly secured to said auxiliary lever to contact said abutment upon the movement of said auxiliary lever relative to the control lever and thereby develop a thrust on said control lever opposed to the resistance of said operating connections.

7. The combination with an aircraft having a movable control surface, a pivotally mounted control member, and an operating connection from said member to the control surface whereby the latter may be operated by the former with a given mechanical advantage, of an auxiliary lever pivotally mounted on said control member to normally rest adjacent and be movable relative thereto, an arm fixedly secured to said auxiliary lever to project laterally with respect to both said member and lever, an abutment fixedly mounted on said aircraft without the normal, inactive path of movement of said arm, means for swinging said auxiliary lever relative to the control member to project the extremity of said arm beyond the aforesaid path of movement, and means of cooperation between the abutment and the extremity of said arm effective upon the projection of the extremity of said arm beyond said path of movement to thereby develop an additional and supplemental mechanical advantage for said control member.

8. In an aircraft control mechanism the combination with a pivoted control lever, of means for connecting said lever to a movable airfoil, an angularly formed auxiliary lever mounted at its elbow on said control lever for pivotal movement relative thereto, means to limit the movement of said auxiliary lever relative to said control lever, a stationary cam mounted opposite the angularly disposed lower extremity of said auxiliary lever, a cam-follower carried by the angularly disposed lower extremity of the auxiliary lever, and means for moving said auxiliary lever relatively to the control lever and thereby project the cam-follower into operative contact with said cam to develop a thrust on said control lever in opposition to the aforesaid means connecting it with a movable airfoil.

9. In an aircraft control mechanism the combination with a pivoted control lever, of a push-pull rod system pivotally connected to said control lever for the operation of a movable airfoil, an auxiliary lever in the form of a bellcrank mounted at its elbow on said control lever for pivotal movement about the pivot constituting the connection between said push-pull rod system and the control lever whereby one arm of said auxiliary lever normally rests adjacent said control lever and the other arm projects laterally therefrom and at an angle to the control lever, a roller rotatably mounted at the free end of said laterally projecting arm, a stop carried by said laterally projecting arm of the auxiliary lever to limit the movement of said auxiliary lever relative to the control lever in either direction, a member eccentric to the pivots of the control and auxiliary levers, and means to swing the auxiliary lever about its pivot and relative to the control lever to establish operative coaction between said roller and said eccentric member to develop a thrust on the control lever in opposition to the resistance of the push-pull rod system aforesaid.

10. The combination with a unitary control mechanism for the adjustment of the movable airfoils of an aircraft, of means for increasing the normal operative power of said control mechanism comprising a normally inoperative auxiliary mechanism adjustable independently of said control mechanism, and stationary means reacting with said auxiliary mechanism upon its independent adjustment to develop an additional thrust in the control mechanism opposed to the resistance of the movable airfoils.

11. The combination with the unitary control mechanism for the adjustment of the control surfaces of an aircraft, of means for additively increasing the normal operative power of said control mechanism comprising an auxiliary mechanism mounted for movement independently of and relative to said control mechanism, and means associated with said auxiliary mechanism to react therewith only upon its movement relative to the control mechanism and thereby supplement and augment the power of the control mechanism normally applied in opposition to the resistance of the aforesaid control surfaces.

12. The combination with a control lever for the adjustment of the control surfaces of an aircraft, of means for increasing the operative effectiveness of said control lever, comprising an auxiliary lever pivoted to said control lever for movement relative thereto, means under the control of said auxiliary lever to be projected laterally from said control lever upon the movement of the auxiliary lever relative thereto, and stationary means reacting with said last means when projected laterally as aforesaid to thereby supplement and augment the thrust of the principal control lever in opposition to the resistances of the control surfaces.

13. The combination with a conventional control lever for the adjustment of the control surfaces of an aircraft, of means for increasing the operative effectiveness of said control lever comprising an auxiliary lever pivoted to said control lever for movement in unison therewith or relative thereto, an arm under the control of said auxiliary lever to be projected laterally from the control lever upon the movement of the auxiliary lever relative to the control lever, and a fixed abutment to contact and react with said arm when projected laterally as aforesaid to thereby supplement and augment the thrust of the control lever in opposition to the resistances of the aircraft control surfaces.

14. The combination with a control lever for the adjustment of the control surfaces of an aircraft, of means for increasing the operative effectiveness of said control lever comprising an auxiliary lever pivoted to said control lever for movement in unison therewith or relative thereto, a stationary abutment adjacent to said control lever, and an arm fixed to said auxiliary lever for movement therewith to be projected laterally from said control lever upon the movement of the auxiliary lever relative thereto to contact said abutment and thereby develop a thrust on the control lever in opposition to the resistance of the aircraft control surfaces.

15. The combination with a control lever for the adjustment of the control surfaces of an aircraft, of means for increasing the operative effectiveness of said control lever comprising an auxiliary lever pivoted to said control lever for movement in unison therewith or relative thereto, a stationary cam abutment adjacent to said control lever, and an angularly disposed arm fixed to said auxiliary lever for movement in unison therewith and normally occupying a position out of possible contact with said abutment and to be projected laterally from said control lever upon the movement of the auxiliary lever relative thereto to contact and operate over said abutment and thereby supplement and augment the thrust of the control lever in opposition to the resistance of the control surfaces.

EDOUARD H. SCHENK.

REFERENCES CITED

The following references are of record in the file of this patent:

UNITED STATES PATENTS

| Number | Name | Date |
| --- | --- | --- |
| 433,978 | Corning | Aug. 12, 1890 |
| 912,595 | McClaren | Feb. 16, 1909 |
| 1,455,431 | Dicks | May 15, 1923 |
| 1,689,648 | Voleske | Oct. 30, 1928 |
| 1,998,362 | Dodson | Apr. 16, 1935 |
| 2,037,551 | Vischer | Apr. 14, 1936 |
| 2,053,950 | Franklin | Sept. 8, 1936 |